Aug. 10, 1965   E. A. ERIKSSON   3,199,665
RUST PREVENTING CAPSULE
Filed Sept. 6, 1963
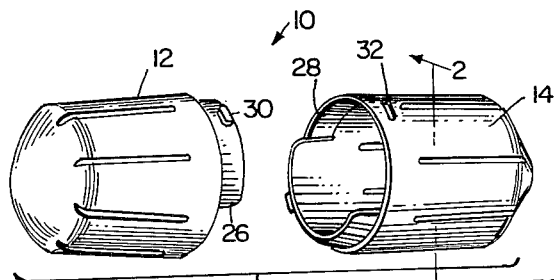
FIG.1
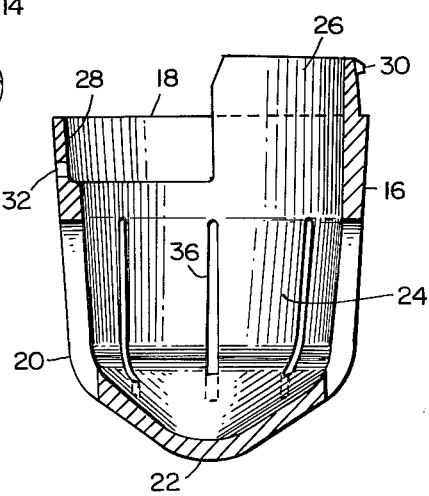
FIG.2
FIG.3
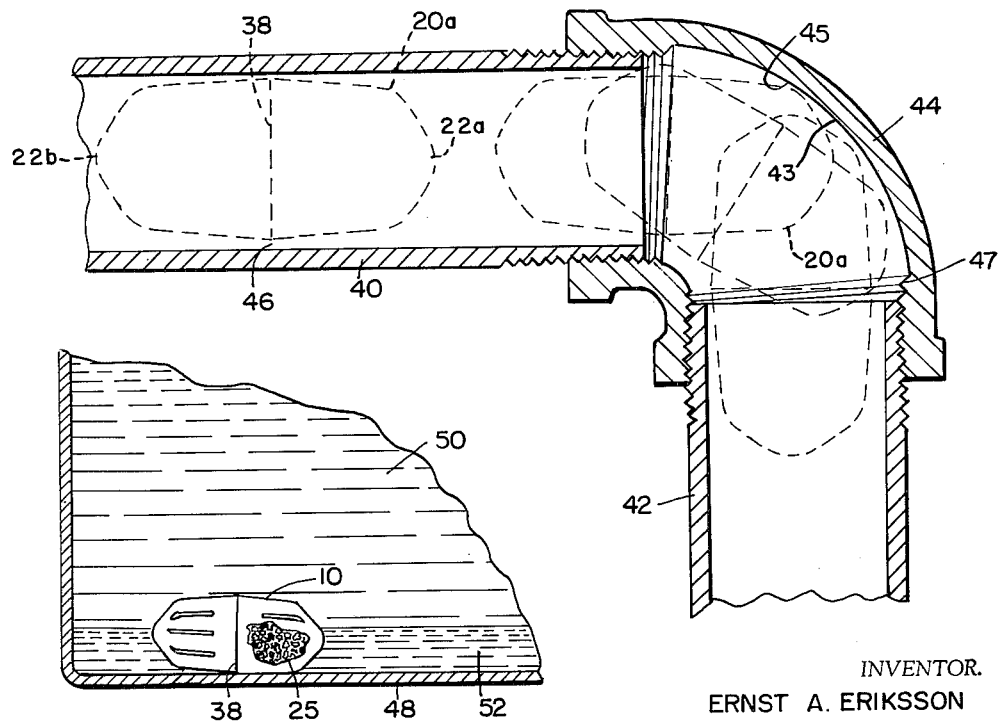
FIG.4
INVENTOR.
ERNST A. ERIKSSON
BY
*Russell, Chittick, & Pfund*
ATTORNEYS

United States Patent Office 3,199,665
Patented Aug. 10, 1965

3,199,665
RUST PREVENTING CAPSULE
Ernst A. Eriksson, Lexington, Mass., assignor to Herbert J. Atkinson, doing business as Sudbury Laboratories, Sudbury, Mass., a sole proprietorship
Filed Sept. 6, 1963, Ser. No. 307,191
1 Claim. (Cl. 206—.5)

This invention relates to petroleum storage tanks and more particularly to a means for preventing internal rust and corrosion of the tank walls.

Water caused by condensation will collect in all types of tanks. In petroleum storage tanks, the condensation water will eventually settle on the tank bottom due to the fact that water has a higher specific gravity than oil. Small droplets of water carried along with the petroleum will often add to the accumulation of condensation water, resulting in corrosion or rust of the ferrous metal surfaces and a production of rust deposits along the tank bottom. Each time the tank is filled, the rust deposits are disturbed, causing some rust particles to enter the fuel lines. This in turn causes clogging of filters, nozzles and other types of restricted orifices.

Continued corrosion gradually weakens the tank bottom, eventually causing leaks necessitating replacement or repair of the tank. Moreover, as the water settles through the petroleum, it may combine with a small amount of sulphur and other contaminants in the petroleum to form an acid condition of the aqueous phase. When an acid condition exists in water at the tank bottom, the corrosion rate is of course markedly increased.

Corrosion inhibiting compounds of the type insoluble in mineral oils but soluble in water have since been developed to deal with the above-mentioned corrosion problem. Although these compounds take many varied forms, they are usually produced in a powder or loose crystal form. In initial applications, the compounds were simply dumped in a loose form into the petroleum storage tanks through any available inlet. The compounds, being heavier than petroleum or water, immediately sank to the bottom of the tank and began to dissolve in the water. It should be noted at this time that as certain crystals of this type dissolve, they coat the inner tank surface with a protective film and in addition, neutralize any existing acid condition, thereby effectively inhibiting further corrosion of the metal surfaces and in turn resulting in a substantial increase of the tank's useful life.

As time progressed however, experience showed that when rust inhibiting compound crystals were simply dumped into the tank in loose form, the crystals tended to dissolve too rapidly, thereby providing only temporary rust protection. In addition, the loose crystals exhibited a tendency to move about within the tank, sometimes becoming clogged either in the tank outlet or in fuel filters and nozzles. In order to overcome some of these disadvantages the crystals were subsequently placed in elongated tubular cartridges having perforated side walls.

It is well known, however, that many petroleum tanks are filled through a fill piping system leading from a remotely positioned inlet and including one or more 45° or 90° turns. Consequently, it can be seen that the elongated tubular shape of the aforementioned cartridges prevented their passage through conventional fill piping systems with the result that it became necessary either to remove a plug in the top of the tank or in the alternative, to disconnect a portion of the fill piping in order to provide a means of depositing a cartridge within the tank. Moreover, once deposited within the tank, the elongated cartridges sometimes settled directly over the tank outlet, thereby preventing further escape of fuel oil from the tank.

The applicant has succeeded in eliminating these disadvantages by providing a capsule capable of being deposited in a fuel oil storage tank without the need of either removing a tank plug or dismantling some of the existing piping. The capsule, having a circular cross section, is enlarged at its intermediate portion and provided with walls decreasing gradually from said intermediate portion to form spaced shoulders, at which point the walls then terminate in relatively blunt ends. Tests have shown that this capsule can be passed through any conventional piping arrangement having a given standard pipe size and incorporating standard fittings such as 45° and 90° elbows. In addition, the capsule walls are provided with longitudinal spaced inlet slots which extend from an area adjacent the midpoint of the capsule to a point beyond the aforementioned spaced shoulders. These slots are so dimensioned as to retard the dissolution rate of the rust inhibiting compound while simultaneously preventing escape of the solid compound from within the capsule. In addition, the possibility of the capsule blocking the tank outlet is completely obviated by its outer configuration.

It is therefore an object of the present invention to provide a capsule containing a rust inhibiting compound, the capsule capable of being deposited in a tank by being passed through the fill piping system.

Another object of the present invention is to provide a capsule containing a rust inhibiting compound and having slotted walls, the slots in the walls suitably dimensioned to retard the dissolution rate of the rust inhibiting compound without allowing said compound to escape in loose form into the tanks.

Another object of the present invention is to provide a capsule comprised of two interlocked half sections which may be filled when in a disassembled state and subsequently assembled by hand without the need of additional tools.

Another object of the present invention is to reduce manufacturing costs and inventory problems by providing a capsule having two identical interlocking half sections.

These and other objects of the present invention will become more apparent as the description proceeds with the aid of the accompanying drawings in which:

FIG. 1 is a perspective view of two identical capsule cup-shaped section halves prior to their assembly;

FIG. 2 is an enlarged sectional view of one cup-shaped section taken along line 2—2 of FIG. 1;

FIG. 3 is a diagrammatic view illustrating the movement of a capsule through a 90° turn in a conventional fill piping system;

FIG. 4 is a view of a capsule resting on the tank bottom.

Referring now to the drawings, it can be seen that a capsule generally indicated at 10 is comprised basically of two interlocked cup-shaped sections 12 and 14. Each cup-shaped section is in turn comprised of a circular wall 16 having an enlarged open end 18. The outside diameter of wall 16 decreases gradually for a limited distance from open end 18 to a shoulder 20, thereafter decreasing rapidly to form a relatively blunt end 22.

It should be noted at this time that the walls of the capsule are relatively thin and can be formed of any number of known substances as for example metal or plastic. When joined in an interlocked relationship as shown in FIG. 4, the two capsule sections cooperate to form an inner chamber 24 filled with a rust inhibiting compound 25 as will hereinafter become apparent.

The means of placing two capsule sections in an interlocking relationship will now be described. Each cup-shaped section is provided along the rim of its open end with both a semi-circular wall extension 26 and a semi-circular wall extension receiving groove 28. As can be seen in FIG. 2, the wall extension 26 is provided with a tapered cross section and an integrally fabricated outwardly disposed detent 30. The wall extension receiving groove 28 is further provided with a detent receiving slot 32. When assembling the capsule, both cup-shaped sections 12 and 14 are first filled with a rust inhibiting compound 25, herein shown in crystal form. The two sections are then axially aligned with the wall extension 26 of each section oppositely disposed to the wall extension receiving groove 28 of the other section. The two sections are then pushed together, each wall extension 26 entering an oppositely disposed wall extension receiving groove 28 and thereby causing detents 30 to lock within detent receiving slots 32. In this manner, it can be readily seen that the two cup-shaped sections 12 and 14 are easily and quickly placed in interlocking engagement.

As can be further seen in FIGS. 1 through 4, each cup-shaped section is provided with a plurality of spaced longitudinal inlet slots indicated typically at 36. Each inlet slot 36 extends from a point adjacent the open end of the cup-shaped section to a point beyond shoulder 20. The lateral dimensions of inlet slots 36 are so designed as to prevent the escape of the rust inhibiting compound crystals 25 from within inner chamber 24 while at the same time permitting liquid to circulate through the chamber at a controlled rate.

When fully assembled as shown in FIG. 4, the capsule 10 is provided with an enlarged intermediate portion generally indicated at 38 having an outside diameter slightly smaller than the inside diameter of pipe used in conventional fill pipe installations. This has been illustrated in FIG. 3 wherein the outline of a capsule has been shown by dotted lines as it passes through a portion of a fill pipe system including two pipe sections 40 and 42 joined in a 90° turn by a conventional pipe elbow 44. As can be readily seen from this figure, a small space 46 is provided between the enlarged intermediate portion 38 of capsule 10 and the inner diameter of pipes 40 and 42. In this manner, once the capsule has been deposited in the pipe, a flow of fuel can then be provided in order to create a pressure within the pipe behind the capsule tending to push the capsule toward the tank.

As the capsule reaches the 90° turn provided by elbow 44, its axial travel within pipe 40 causes the leading shoulder 20a to strike the inner curved surface 43 of elbow 44 as at 45. This in turn causes the forward end 22a of the capsule to be deflected downwardly from its substantially straight line axial movement through pipe 40.

At the instant of impact, midsection 38 has progressed beyond the end of pipe 40. In addition, the bearing of leading capsule shoulder 22a against curved surface 43 pushes the leading rounded nose 22a clear of the pipe threads 47 of elbow 44, thereby axially introducing it within pipe 42 in an unhesitating and unrestricted manner. The trailing half section of the capsule is so located in relationship to leading capsule shoulder 20a that the trailing capsule end 22b can move free of pipe 40 within elbow 44, thereby negotiating the turn without causing a restriction of the fill line.

Once within the tank, the capsule sinks readily through the fuel oil and settles on the tank bottom 48 as shown in FIG. 4. When so positioned, some of the inlet slots 36 are open to the fuel oil 50 and some are open to the accumulation of water 52 along the tank bottom. It should be noted that because the capsule walls taper slightly from the enlarged intermediate section 38 towards the blunt ends 22, the capsule will not seat flush on the tank bottom but will instead tilt slightly to expose a portion of its lower surface to the accumulation of water. In this manner, communication between the rust inhibiting compound 25 and the accumulation of water is assured regardless of the water depth.

In addition, the enlarged intermediate section 38 becomes a rocking fulcrum, making the capsule a dynamic item during subsequent filling operations. In this manner, it can move about within the tank, seeking the lowest point where water is accumulated.

When so positioned on the bottom of the tank, water flows through the capsule at a retarded rate due to restricted passageways offered by inlet slot 36. In this manner, rapid dissolution of the rust inhibiting compound 25 is prevented, thereby providing longer lasting protection for the tank. In addition, the dimensions of the slots prevent the crystals from escaping from the capsule's inner chamber to thereafter block the tank outlet or other restricted orifices.

It is my intention to cover all changes and modifications of the invention herein chosen for purposes of disclosure which do not constitute departures from the spirit and scope of the invention.

I claim:

For use in a fuel storage tank of the type connected to a remotely positioned inlet by an intermediate fill piping system, said fill piping system including straight lengths of pipe interconnected by standard pipe fittings such as 45° and 90° elbows, means for carrying a rust inhibiting compound from said inlet through said piping system into the interior of said tank comprising: two identical cup-shaped members, each said members having a truncated conical wall section tapering gradually from an enlarged open end to a rounded peripheral shoulder, said shoulder connecting said wall section to an integral relatively blunt conically shaped end, said cup-shaped members each further provided with spaced inlet slots beginning in said truncated conical wall section adjacent the open end thereof and extending across said rounded peripheral shoulder into said integral relatively blunt conical end; interlocking means for joining two of said cup-shaped members at their open ends to form a capsule having an enlarged midsection and an inner chamber adapted to contain said rust inhibiting compound, the outer diameter of said midsection being slightly smaller than the inner diameter of said pipe and fittings, the distance between the rounded peripheral shoulders of said joined cup-shaped members and the enlarged midsection of the capsule formed thereby being such that as said capsule progresses through a straight length of fill pipe connected to a pipe fitting, said midsection will pass beyond the end of the pipe before the leading rounded peripheral shoulder of the capsule is contacted and turned by the inner curved surface of the fitting.

References Cited by the Examiner

UNITED STATES PATENTS

| 620,917 | 3/99 | Hammond | 206—84 |
| 666,723 | 1/41 | Wilmot. | |
| 1,149,829 | 8/15 | Heberling et al. | 206—05 |
| 2,251,080 | 7/41 | Taber | 206—05 |
| 2,533,300 | 12/50 | Watkins. | |

FOREIGN PATENTS

| 870,985 | 3/53 | Germany. |
| 317,946 | 8/29 | Great Britain. |

THERON S. CONDON, *Primary Examiner.*